United States Patent [19]

Long

[11] Patent Number: 5,661,758
[45] Date of Patent: Aug. 26, 1997

[54] SINGLE CYCLE DATA ENCODING METHOD AND APPARATUS

[76] Inventor: Michael E. Long, 2451 Harpoon Dr., Stafford, Va. 22554

[21] Appl. No.: 585,561

[22] Filed: Jan. 16, 1996

[51] Int. Cl.$^6$ ............................. H04L 25/49; H03K 7/08; H03K 7/04
[52] U.S. Cl. .................... 375/296; 375/238; 375/239
[58] Field of Search ..................... 375/295, 296, 375/238, 285, 239, 259; 455/102, 43; 327/31; 341/53

[56] References Cited

U.S. PATENT DOCUMENTS

| | | |
|---|---|---|
| 3,840,891 | 10/1974 | Hellwarth . |
| 3,887,873 | 6/1975 | Duncan et al. . |
| 3,949,199 | 4/1976 | Odom . |
| 4,041,239 | 8/1977 | Haass ........................................ 375/296 |
| 4,188,581 | 2/1980 | Stevenson . |
| 4,346,354 | 8/1982 | Hanna . |
| 4,593,267 | 6/1986 | Kurdo et al. . |
| 5,105,445 | 4/1992 | Karem et al. ........................... 375/296 |
| 5,113,414 | 5/1992 | Karam et al. ........................... 375/296 |
| 5,202,900 | 4/1993 | Leitch .................................... 375/296 |
| 5,253,271 | 10/1993 | Montgomery . |
| 5,278,637 | 1/1994 | Naimpally . |
| 5,287,387 | 2/1994 | Birchler ................................. 375/296 |
| 5,363,408 | 11/1994 | Paik et al. . |
| 5,369,789 | 11/1994 | Kusugi et al. . |
| 5,412,689 | 5/1995 | Chen et al. . |

FOREIGN PATENT DOCUMENTS

| | | |
|---|---|---|
| 0 256 700 | 2/1988 | European Pat. Off. . |
| WO91/03108 | 3/1991 | WIPO . |

*Primary Examiner*—Tesfaldet Bocure
*Attorney, Agent, or Firm*—Richard C. Litman

[57] ABSTRACT

A method and device for manipulating data encoded for introduction to a periodic carrier signal. Distinct disruptions having selected qualities are defined for each character of data. Individual disruption are introduced to individual cycles of the carrier signal. Selected qualities of the disruption used to define the characters of data include the duration of the disruption and the starting time of the disruption relative to the beginning of the cycle. Carrier signals containing the disruptions contain large amounts of information which may be transmitted, stored and manipulated as characters at the level of individual cycles.

11 Claims, 3 Drawing Sheets

SINGLE CYCLE DATA ENCODING METHOD AND APPARATUS

BACKGROUND OF THE INVENTION

1. Field of the Invention

The present invention relates to the field of encoding data for transmission, storage and manipulation. More particularly, it relates to a method wherein qualities of individual disruptions are selected to represent characters of data. Each disruption is then introduced onto an individual cycle of a carrier signal.

2. Description of the Prior Art

There are many inventions found in the prior art for increasing the flow of data carried by a carrier signal. For example U.S. Pat. No. 3,887,873 issued Jun. 3, 1975, to J. E. Duncan et al. shows a pulse amplitude modulation composite signal where telemetry information is contained in the amplitude of a signal and video information is contained in the frequency of the signal.

U.S. Pat. No. 5,253,271 issued Oct. 12, 1993, to M. A. Montgomery shows a finite state machine which modulates an orthogonal carrier signal into an analog transmission waveform for passage over a bandpass channel.

U.S. Pat. No. 5,278,673 issued Jan. 11, 1994, to S. V. Naimpally shows a system which conveys digital data in a field interlaced television signal through quadrature amplitude modulation (QAM) of a Fukinuki carrier.

U.S. Pat. No. 5,363,408 issued Nov. 8, 1994, to W. H. Paik et al. shows a system for selectively encoding data for transmission using one of a plurality of QAM modes wherein a receiver receives QAM data and detects the QAM mode of the received data.

U.S. Pat. No. 5,369,789 issued Nov. 29, 1994, to H. Kosugi shows a burst signal transmitter including a sample and hold circuit for transmitting signals which are both amplitude and phase modulated.

U.S. Pat. No. 5,412,689 issued May 2, 1995, to B. K. Chan et al. shows a method of restricting cross talk within a transmission medium by encoding information using amplitude modulation of orthogonal modes of the transmission medium.

European Application, Publication No. 0 256 700, published Mar. 7, 1991, shows a method for digitally synthesizing the amplitude modulation of a carrier signal.

Patent Cooperation Treaty Application, Publication No. WO 91/03108, published Mar. 7, 1991, shows a gain/pulse compensation apparatus including a feedback detector which produces a baseband feedback signal in a linear amplifier feedback loop.

None the above patents show or suggest encoding data for application to individual cycles as disclosed herein. None of the above inventions and patents, taken either singly or in combination, is seen to describe the instant invention as claimed.

SUMMARY OF THE INVENTION

A method and device for encoding data wherein each character of the data is represented by a disruption introduced to an individual cycle of a carrier signal. Each disruption is defined by selected qualities related to an associated cycle of a periodic carrier signal. The selected qualities include the relationship between the beginning of the disruption and the beginning of the cycle. Another quality included is the duration of the disruption. Since a number of beginning points and a number of durations are separately distinguishable on an individual cycle, each of many characters may be represented by a distinct disruption having a unique combination of qualities. Each character contains an amount of information which increases with the number of distinct characters. Thus, by applying coded disruptions to individual cycles, each individual cycle may carry a character representing many bits of information.

The amount of information possibly contained within each cycle of a carrier signal is, thus, a function of the minimum resolution at which differing disruption starting points and durations may be distinguished. For instance, a cycle on which 16 disruption starting points can be distinguished and 16 disruption durations can be distinguished can accommodate a disruption containing 8 bits of information.

An example of such a signal is a 200 Hz, 4 V electromagnetic wave. The disruptions are most readily produced by introducing precise localized changes in the slope of the changing energy level of each individual cycle. The inception of each disruption is determined from a common point of each cycle, such as the point of peak voltage level or the point of zero voltage level. It is frequently beneficial to limit each disruption to a portion of each cycle. In the example shown disruptions are contained within a half cycle or within 2,500 μs of each cycle of the 200 Hz signal. Disruptions may be limited to any desired portion of a signal, such as a selected fraction a cycle or a single phase of an alternating current signal. Disruption starting times differing by 100 μs can be distinguished on a 200 Hz, 4 V carrier signal using presently available electronic devices. Such devices can also distinguish disruption durations differing by 50 μs on such a signal. Disruptions with 16 distinct starting times ranging from 100 to 1600 μs and 16 distinct durations ranging from 50 to 800 μs may be selected. A disruption that has a maximum duration of 800 μs and latest starting time, 1,600 μs after the beginning of the cycle, to terminate within the half cycle duration of 2,500 μs. Each disruption introduced onto a cycle of the carrier wave, thus, represents one of 256 different characters or 8 bits of information. When transmitting data using a 200 Hz carrier wave 8 bits per cycle or 1,600 bits per second is propagated down the wave medium.

Distinct disruptions may be introduced to a wave by a disruption generator which receives the data to be encoded. The disruption generator translates the data into disruptions having specific selected starting times and specific selected durations. A carrier signal generator provides timing information to synchronize the disruption generator with the period of the carrier signal. The disruption generator then introduces each precise disruption to a cycle of the carrier signal. This can be accomplished by controlling a switch between a high frequency signal generator and an adder that combines the disruption signal and the carrier signal. The disruption may also be created by precisely controlling the gain of an amplifier through which the carrier signal passes or by exciting specific materials to produce disruptions having desired qualities.

Data is thus encoded in a periodic signal in a manner providing for improved transmission, storage, and manipulation. The improved capacity of a signal to carry data using the present invention allows for more efficient transmission through suitable transmission lines or channels using periodic signals. Selected data may be easily stored by sending the specific cycles containing the selected data through a continuous loop timed precisely to accept the selected cycles. A convenient loop is the feedback loop of an amplifier. The qualities of the disruptions are also easily translated into data stored on hard storage devices such as magnetic and optical media.

Accordingly, it is a principal object of the invention to provide a method of translating data into a code, each character of which is introduced into an individual cycle of a periodic carrier signal.

It is another object of the invention to provide a device to introduce such encoded data to a carrier signal.

It is a further object of the invention to create disruptions each having a selected combination of a starting time and a duration to represent characters of data.

Still another object of the invention is to create disruptions in the energy level of individual cycles of an electromagnetic wave, each disruption representing a character of data.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
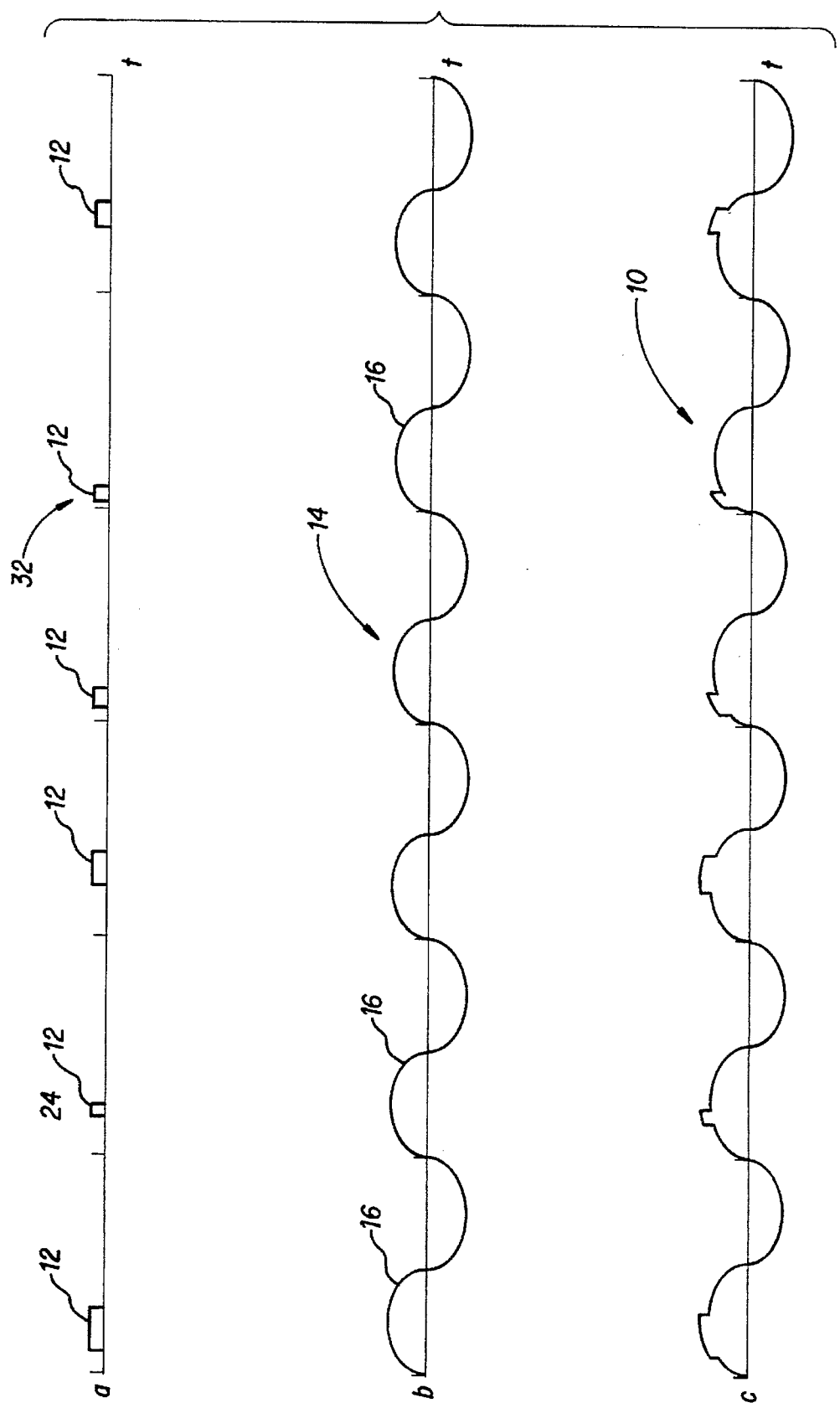
FIG. 1 is a diagram of disruptions and the relationship of disruptions to a carrier signal according to the present invention.

A diagram of a coded signal 10 according to the present invention is shown in FIG. 1. The coded signal 10 is created by introducing disruptions 12 into a carrier signal 14. Carrier signal 14 is a regular periodic signal produced by carrier signal generator 26. The periodic characteristics of the signal defines a series of individual cycles 16. Each disruption 12 represents a character of data and is introduced into a single cycle 16 of periodic carrier signal 14. Each disruption 12 is distinct and represents a specific character by reference to specific qualities of the disruption. At least one quality of each disruptions is related to the periodic nature of carrier signal 14. The qualities used in the preferred embodiment are the starting time of disruption 12 as related to the period of its associated cycle 16 and the duration of disruption 12.

In the preferred embodiment the encoded signal 10 is an electromagnetic wave. An apparatus to create such a wave is represented by the block diagram shown in FIG. 2. A timing signal processor and data encoder 18 receives data 20 from a data processor 22. Timing signal processor and data encoder 18 determines the starting times and durations of each of a series of disruptions. Timing signal processor and data encoder 18 processes the data to be encoded by forming the data into characters. Each character is defined by selected qualities. The starting time and duration of each disruption are selected to correspond to the selected qualities of a character of data to be represented. Each character of data is thus represented by a disruption to be introduced into an individual cycle 24 of carrier signal 14.

A timing signal 16 from carrier signal generator 26 is inputted to timing signal processor and data encoder 18. The timing signal is used to relate the starting time of each disruption 12 with the period of carrier signal 14. Each disruption is also limited to an advantageous portion of cycle 16 to which it is introduced. A particular half or quarter of each energy cycle may be selected for the introduction of the disruptions. Timing signal processor and data encoder controls a disruption generator 28. Disruption generator 28 generates a disruption signal 32 which is switched on according to the input from disruption control signal 30. The disruption generator shown includes high frequency signal generator 31 having an output controlled by switch 33. Carrier signal and disruption adder 34 combine disruption signal 32 and carrier signal 14 thus forming disruptions of precise localized changes of energy level in individual cycles 16 of carrier signal 14. The precise changes in the energy level of individual cycles may alternatively be introduced to the carrier signal by precisely controlling the gain of an amplifier through which the carrier signal passes. The coded signal 10 outputted from carrier signal and disruption adder 34 may then be treated, such as by amplifier 36 and filter 38, before being transmitted, stored or processed.

Figure 2:
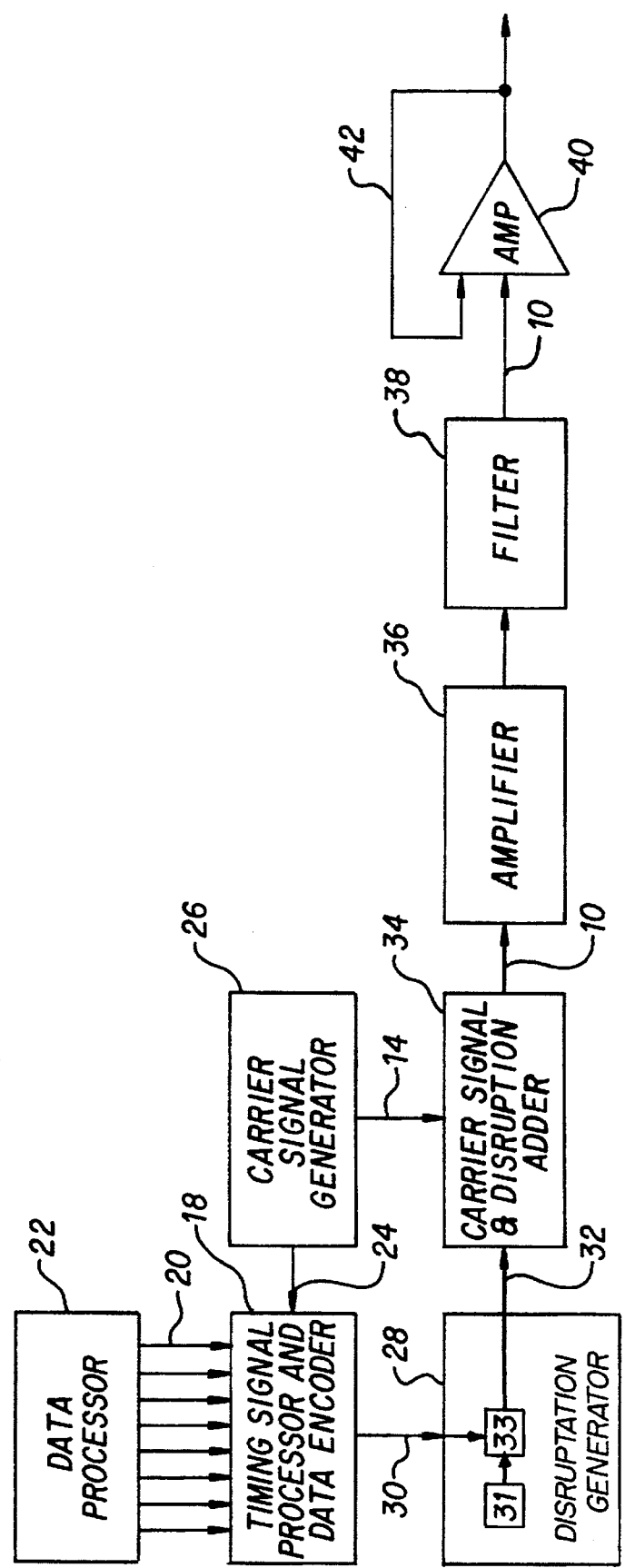
FIG. 2 is a block diagram of a device of the present invention for introducing disruptions to a carrier signal.

FIG. 2 shows the coded signal 10 input to a storage device. The storage device shown comprises amplifier 40 including feedback loop 42. Feedback loop 42 is constructed to return to amplifier 40 the first of a selected number cycles immediately after the last of the selected number of cycles has been inputted. In this manner the selected cycles may be virtually stored in the feedback loop.

Figure 3:
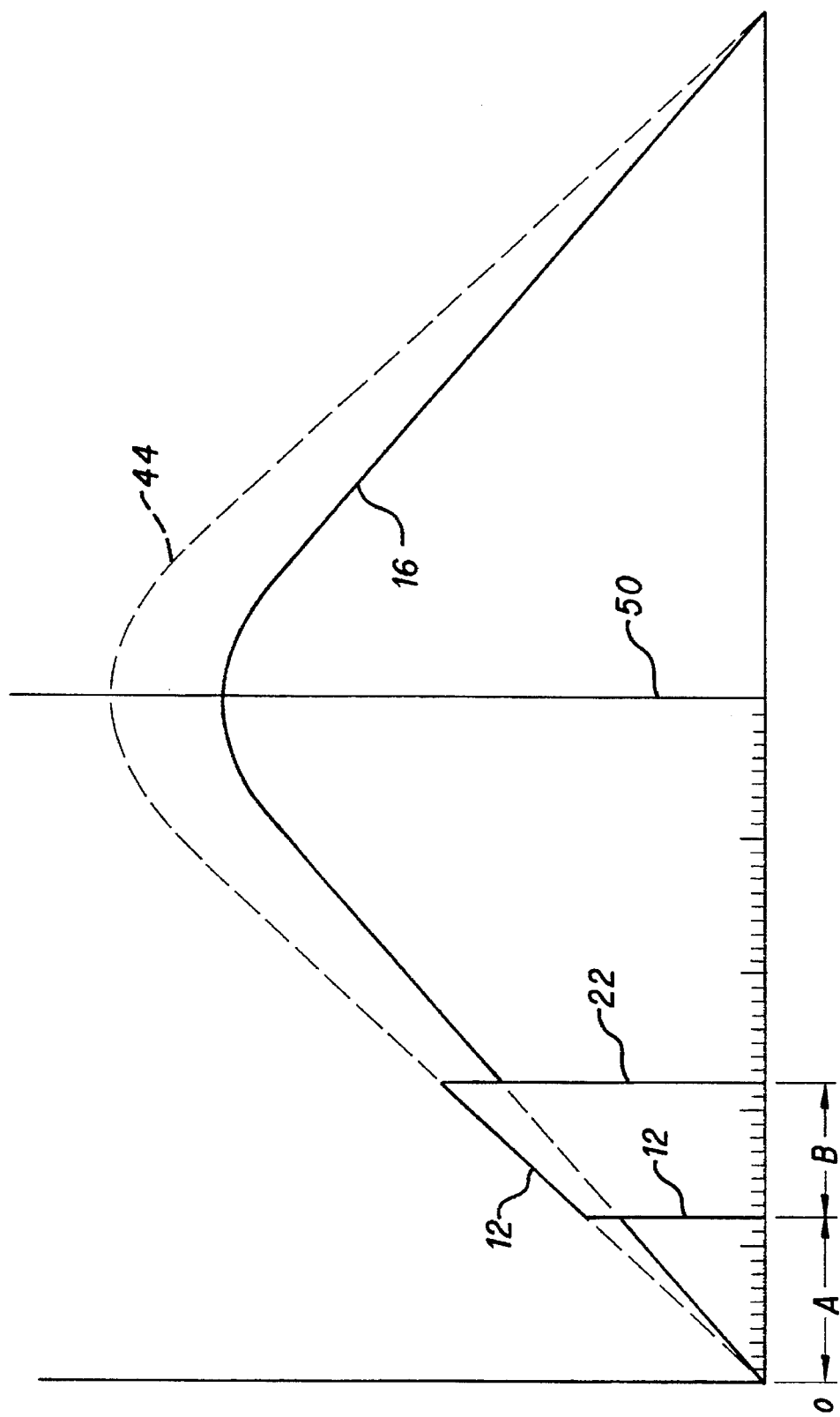
FIG. 3 is a diagram of a single cycle of a carrier signal including a disruption according to the present invention.

Each disruption representing a character of data is contained in a single cycle of carrier signal 14. An example of a single cycle of a carrier wave including a representative disruption is shown in FIG. 3. A cycle 16 of a 4 volt, 200 Hz carrier signal 14 is shown. A disruption 12 is shown on a half of cycle 16. Disruptions are confined within a half of each cycle for improved convenience when locating and decoding the disruptions. It is advantageous to limit the disruptions to a fraction of each cycle having similar characteristics. Disruptions may likewise be confined within a single phase of alternating current signals. The disruption increases the energy level of 4 volt carrier signal 14 to the energy of a 5 volt wave 44 of identical frequency and phase. Each disruption has a starting time shown as A and a duration shown as B. The disruption shown starts 600 µs after the zero energy level and has a duration of 1000 µs. The resolution attainable for a 200 Hz carrier signal allows starting times 100 µs apart to be distinguished and durations differing by 50 µs to be distinguished. Therefore, the starting time A may have any of 16 values ranging from 100 µs to 1,600 µs. The duration B may have any of 16 values ranging from 50 µs to 800 µs. Each starting time A may be combined with each duration B to create 256 different distinct disruptions representing 256 distinct characters. Eight bits of information is thus represented by each character and is carried by each cycle of the 200 Hz carrier wave. 1,600 bits per second are propagated in signal 10. Carrier waves of other frequencies and amplitudes may also be used. For higher frequencies the shorter period of each cycle limits the number of distinct starting points and limits the duration of the disruptions employed. For example, only 4 starting times and a single duration may be used to create four distinct disruptions to be introduced to cycles of a 50 Mhz carrier wave. Although each cycle may only carry two bits of data, the increased frequency permits 100M bits per second to be contained in a 50 Mhz carrier signal.

It is to be understood that the present invention is not limited to the sole embodiment described above, but encompasses any and all embodiments within the scope of the following claims.

I claim:

1. A method of encoding data for transmission, storage, and manipulation, the method comprising the steps of:

producing a carrier signal having a detectable periodic characteristic, the carrier signal including a plurality of cycles defined by the periodic characteristic of the carrier signal; and introducing individual disruptions into individual cycles of the carrier signal, each disruption associated with one of the individual cycles, each disruption including a starting time related to the periodic characteristic of the carrier signal and a duration, whereby each disruption represents a specific character of the data to be encoded.

2. The method according to claim 1 wherein the periodic characteristic of the carrier signal is regular.

3. The method according to claim 1 wherein the carrier signal is an electromagnetic wave.

4. The method according to claim 3 wherein each disruption is contained in a predetermined half of each associated cycle.

5. The method according to claim 3 wherein each disruption to the electromagnetic wave comprises a change of energy level within each cycle of the electromagnetic wave.

6. The method according to claim 5 wherein said disruptions to the carrier signal are formed by passing the carrier signal though a signal adder which combines the carrier signal and a disruption signal, and by controlling a switch to selectively introduce the disruption signal to the signal adder.

7. The method according to claim 5 wherein the step of introducing disruptions to the carrier signal comprises passing the carrier signal through an amplifier having a controllable gain and selectively controlling the gain of said amplifier to introduce increased energy levels to selected portions of the individual cycles of the carrier signal.

8. A device for encoding data for transmission, storage, and manipulation, said device comprising:

propagating means for generating a periodic carrier signal;

combining means for receiving the periodic signal generated by said propagating means, said combining means introducing a disruption to individual cycles of the carrier signal, each disruption having a starting time and a duration; and control means for controlling said combining means, said control means accepting the data for encoding, said control means accepting timing information from said propagating means, said control means inducing said combining means to introduce a disruption to an individual cycle of the carrier signal, whereby each disruption represents a character of the data encoded.

9. The device according to claim 8 wherein said combining means comprises:

generating means for generating a disruption signal;

adding means for combing the carrier signal with the disruption signal; and switch means for passing said disruption signal from said generating means to said adding means, said switch means controlled by said control means for selectively passing the disruption signal to said adding means.

10. The device according to claim 8 wherein said combining means comprises amplifying means for treating the carrier signal, said amplifying means accepting the carrier signal and selectively amplifying a portion of individual cycles of the carrier signal according to input from said control means.

11. The device according to claim 8 further comprising storage means, said storage means including an amplifier synchronized to receive a number of input cycles of the carrier signal, said amplifier having an output and an input, said output connected to said input such that the input cycles are continually cycled through said amplifier.

* * * * *